United States Patent [19]

Eggebrecht et al.

[11] Patent Number: 4,460,957

[45] Date of Patent: Jul. 17, 1984

[54] SELF-PACING SERIAL KEYBOARD INTERFACE FOR DATA PROCESSING SYSTEM

[75] Inventors: Lewis C. Eggebrecht, Rochester, Minn.; Jesus A. Saenz, Coral Springs, Fla.

[73] Assignee: International Business Machines Corporation, Armonk, N.Y.

[21] Appl. No.: 292,070

[22] Filed: Aug. 12, 1981

[51] Int. Cl.³ ............................................. G06F 15/02
[52] U.S. Cl. ..................................... 364/200; 364/518; 364/900
[58] Field of Search ... 364/200 MS File, 900 MS File, 364/518; 340/365 R, 365 S

[56] References Cited

U.S. PATENT DOCUMENTS

| | | | |
|---|---|---|---|
| 3,501,749 | 3/1970 | Cuccio | 364/900 |
| 3,980,994 | 9/1976 | Ying et al. | 364/200 |
| 4,126,898 | 11/1978 | Spangler et al. | 364/900 |
| 4,386,410 | 5/1983 | Pandya et al. | 364/518 |

FOREIGN PATENT DOCUMENTS 2005448 4/1979 United Kingdom .

OTHER PUBLICATIONS

M. D. Alger et al., "Remote Keyboard Interface", *Wireless World*, vol. 87, No. 1545, Jun. '81, pp. 77–78.
"An 8048-Based Keyboard/Display Module", Wescon Conference Record, Sep. 1977, 27/2 pp. 1–4.
R. A. DuPont et al., "Serializer/Deserializer Apparatus", *IBM Technical Disclosure Bulletin*, vol. 22, No. 7, Dec. '79.
IBM Personal Computer Reference Manual, Aug. '81, pp. D–10 and D–12.

*Primary Examiner*—Edward J. Wise
*Attorney, Agent, or Firm*—Sughrue, Mion, Zinn, Macpeak and Seas

[57] ABSTRACT

A serial keyboard interface (28) connects a self scanning programmable serialized keyboard (40) to the system bus (10) of a data processing system. A cable (42) containing only a clock wire (52) and a data wire (58) provides the connection. The keyboard transmits a 9-bit scan out code consisting of a start bit followed by eight serial data bits. The keyboard clock line (52) is connected to the clock or shift terminal of a serial-to-parallel shift register encoder (62) for shifting the data bits on data line (58) into the encoder which has eight parallel output data lines (A, B ... G, H) connected to the system bus. When the encoder (62) contains a complete scan out frame, the start bit is in the most significant stage (h') and sets the D-type latch (68) to apply a CPU interrupt request to the system bus (10). At this time, the $\overline{Q}$ output of latch (68) pulls down the data line to ground potential, thereby disabling the data line and preventing further keyboard transmission of data. When the interrupt request is granted by the CPU, a clear signal resets latch (68) to remove ground potential from data line (58) and thereby permit further transmission of data.

14 Claims, 3 Drawing Figures

SELF-PACING SERIAL KEYBOARD INTERFACE FOR DATA PROCESSING SYSTEM

TECHNICAL FIELD

This invention relates generally to the field of interface circuits for controlling two-way communication between a keyboard and a data processing system and, more particularly, to a self-pacing interface which permits such communication using only two wires between the interface and the keyboard.

BACKGROUND OF THE INVENTION

Keyboard entry control circuits or interfaces are generally well-known in the prior art; however, they are quite complex and require more than two wires between the keyboard and the interface, including, in addition to two wires for carrying clock and data signals, respectively, status lines for indicating the statuses of the keyboard and central processing unit, respectively. Representative prior art keyboard entry control circuits and interfaces are disclosed in the following U.S. Pat. Nos. 3,501,749; 3,533,078; 4,038,640; 4,044,398; 4,126,898 and 4,170,768.

SUMMARY OF THE INVENTION

The present invention eliminates the need for the complex keyboard interfaces of the prior art while, at the same time, requiring only two wires between the interface and the keyboard. The novel interface of the invention provides the following features:

1. Keyboard data rate and clocking are not tied to any specific clock frequency, and data may be sent at any rate.
2. The only timing relationships required are set-up and hold time required with respect to the rising edge of the keyboard clock; thus, such relationships are easy to implement in microcode.
3. Capability of supporting two-way communications between the keyboard and central processing unit (CPU) of the data processing system.
4. Full handshake and synchronous operation.
5. Relatively few components as compared to prior art interfaces.

The presence of one or the other of two voltage levels on the two lines connecting the keyboard and interface functions to control resetting of the keyboard and transmission of keyboard data.

For a better understanding of the present invention, together with other and further advantages and features thereof, reference is made to the following description taken in connection with the accompanying drawings, the scope of the invention being pointed out in the appended claims.

DESCRIPTION OF THE PREFERRED EMBODIMENT

Figure 1:
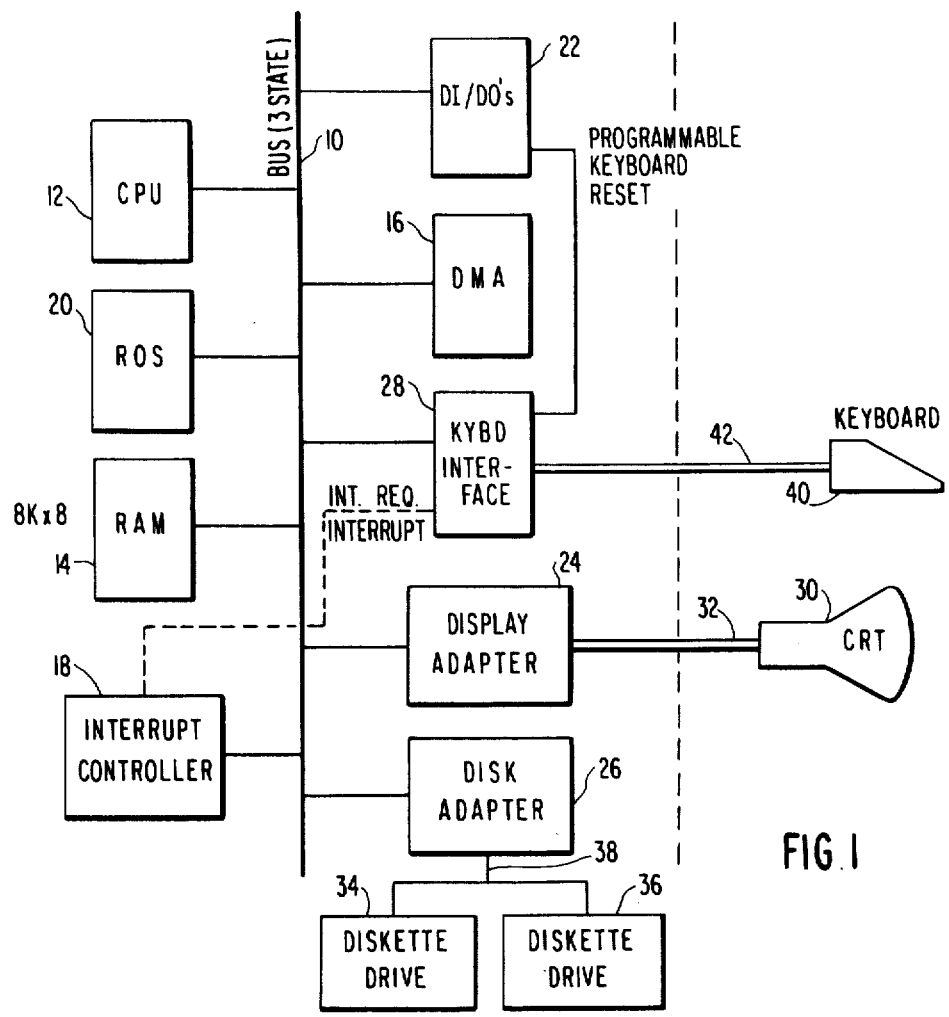
FIG. 1 is a block diagram of a data processing system including the novel interface of the invention.

FIG. 1 is a block diagram of a small computer or data processor, such as a so-called personal computer. More particularly, a three-state system bus 10, including address, data and control lines, interconnects the basic components of the computer to provide for the necessary transfer of address, data and control signals among these components. The components include, for example, the central processing unit (CPU) 12, a dynamic random access memory (RAM), a multiple channel programmable direct memory access (DMA) controller 16, an interrupt controller 18, a read-only storage (ROS) 20, DI/DO's 22, a display adapter 24, a disk adapter 26 and a keyboard interface 28.

A cathode ray tube display device 30 may be connected by a cable 32 to the display adapter 24. A pair of diskette drives 34 and 36 may be connected by a cable 38 to the disk adapter 26. A keyboard 40 is connected by a cable 42 to the keyboard interface 28.

In this preferred embodiment, the CPU 12 is an Intel microprocessor 8088 which is fully disclosed in "The 8086 Family User's Manual, October 1979", published by Intel Corporation, Santa Clara, California". The DMA controller is an Intel 8237 high performance programmable DMA controller also fully disclosed in the above Intel Corporation publication. RAM 14 is any conventional dynamic memory, such as a TI 4116. Interrupt controller 18 is an Intel 8259 chip. ROS 20 is also conventional and may be a Mostek MK 3600, for example. DI/DO 22 is a digital input/digital output interface, such as an Intel 8255A general purpose programmable peripheral interface chip.

Figure 2:
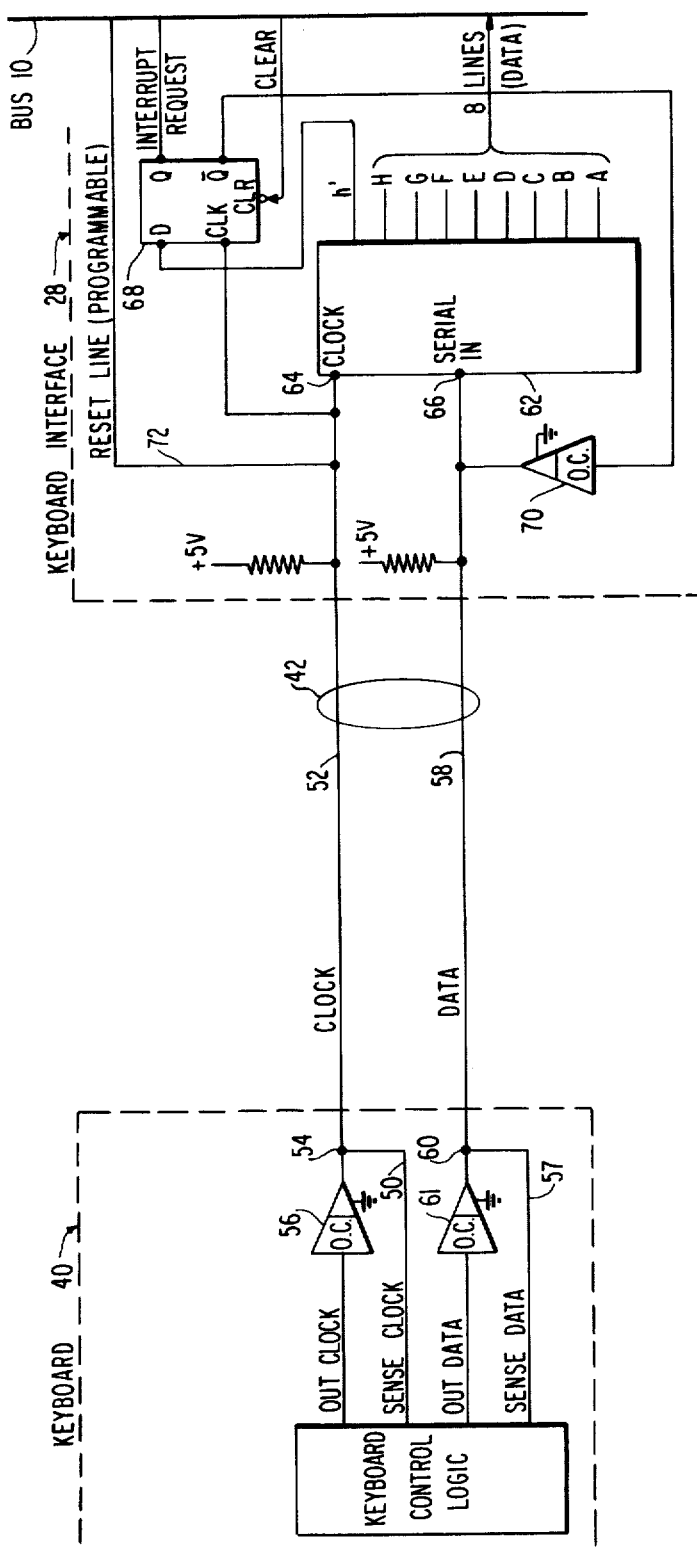
FIG. 2 is a logic block diagram illustrating the details of the novel interface of the invention.

Keyboard interface 28 is the subject of the present invention and is illustrated in detail in FIG. 2.

Keyboard 40 is a programmable self-scanning serialized keyboard which transmits a scan code of 8 series data bits identified in the various key positions. The scan code also includes a start bit; thus, each serial scan code is contained in a 9-bit frame headed by the start bit. Also, in the preferred embodiment keyboard 40 is of the capacitive matrix type and has 83 key positions. The keyboard contains its own microprocessor, such as an Intel 8048, and has an OUT CLOCK line, a SENSE CLOCK line, an OUT DATA line and a SENSE DATA line. Furthermore, each key is capable of make/break and typamatic operation. The keyboard contains self-scanning logic and interface controls which will support the protocol for keyboard interface 28, which protocol is described below.

Keyboard 40, itself, forms no part of the present invention and its circuits and construction are found in copending application Ser. No. 61,719, filed July 30, 1979 and in the following U.S. Pat. Nos.: 3,786,497; 3,921,167; and 4,118,611; all of which are incorporated herein by reference.

In general, keyboard interface 28 is self-clocked or self-paced in that it is clocked or paced by the transmission of the keyboard clock and data, completely independently of any other clock rates in the computer or data processing system. When either the system bus is sending a reset command to the keyboard upon power-up or else the interface has not processed a previous scan code frame, the keyboard is prevented by its control logic from transmitting data. When a complete scan code frame has been stored in the interface, a latch is set to generate an INTERRUPT REQUEST to the CPU via the interrupt controller. When the INTERRUPT REQUEST is granted and the data is transferred to the CPU, the latch is cleared or reset to signal the keyboard via its data line that another scan code may be transmitted to the interface. Only two lines are required in the cable connecting the interface and the keyboard in order to perform all of the data, clocking and status sensing functions.

More particularly, and as illustrated in FIG. 2, the SENSE CLOCK line 50 is tied to the keyboard OUT CLOCK line 52 at junction 54, and an open-collector (OC) gate 56 (such as an SN 7407 shown in Texas Instruments' "The TTL Data Book", second edition, 1976) is connected in the OUT CLOCK line 52 between the keyboard control logic and the junction 54. Furthermore, the keyboard SENSE DATA line 57 is tied to the OUT DATA line 58 at the junction 60, and another open-collector (OC) gate 61 is connected in the DATA line between junction 60 and the keyboard control logic. Cable 42, containing ony the CLOCK line 52 and the DATA line 58, connects keyboard 40 to the novel keyboard interface 28. Interface 28, itself, requires only four wires: the keyboard CLOCK and DATA lines, a +5 volt (+5 V) and a ground (GND) or zero volt line.

Interface 28 contains a serial-to-parallel shift register (74LS299) encoder 62 having a CLOCK terminal 64 and a SERIAL IN terminal 66 for receiving the serial scan code frame on the DATA line 58 from keyboard 40. Encoder 62 has nine stages and eight corresponding parallel DATA output lines, labeled A, B . . . E, H and a start line, labeled h'. Stage A is the lowest ordered or least significant stage, and stage h' is the highest ordered or most significant stage. The most significant stage output line h' is connected to the D input terminal of a D-type edge-triggered latch 68. CLOCK line 52 is connected to the CLK terminal of latch 68. The Q or set output terminal of latch 68 is connected to the system bus 10 and transmits an INTERRUPT REQUEST signal to the CPU 12 via the interrupt controller 18. The $\bar{Q}$ or reset output line of latch 68 is connected through another open-collector (OC) gate 70 to the keyboard DATA line 58. The CLR or reset terminal of latch 68 is also connected to the system bus 10 and receives a CLEAR or reset signal from the CPU when an INTERRUPT REQUEST has been granted and the eight parallel data bits have been transmitted from encoder 62 via DI/DO 22 to a register in the CPU.

The OC gates 56, 61 and 70 are functionally switches which, when closed, place ground or a zero (0) voltage on the line to which their outputs are connected. In other words, if a 1 or UP level appears on a gate input, then the gate output is a 1 (+5 V) or UP.

Now, the operation and protocol of keyboard interface 28 will be described with reference to FIG. 2 and the timing diagram of FIG. 3.

First, both the CLOCK line 52 and the DATA line 58 are tied to +5 volts. The existence of a +5 volts potential on the line will be referred to as the UP state of the line, whereas the existence of 0 or ground potential on a line will be referred to as the DOWN state.

When a key is depressed on keyboard 40, both the OUT CLOCK and DATA are generated. Initially the keyboard sets its OUT CLOCK to a 1. The keyboard then tests or senses the CLOCK line 52 via the SENSE CLOCK line 50 to determine whether the CLOCK line 52 is UP or DOWN. If the CLOCK line 52 is DOWN, the system is requesting keyboard 40 to execute a reset by virtue of a ground signal (RESET) from DI/DO 22 on the reset line 72. This condition can occur upon power-up, and causes the keyboard to reset all of its circuits. However, if the keyboard senses an UP state on CLOCK line 52, then keyboard 40 is enabled and tries to raise the DATA line 58.

The keyboard tests or senses DATA line 58 via the SENSE DATA line 57. If the DATA line is DOWN, then the computer or data processing system has not processed the previous scan code which had been transmitted to the interface 28 (and the $\bar{Q}$ output of latch 62 is still DOWN or 0). Thus, the keyboard is disabled and waits for the DATA line 42 to go to 1 or UP. When, or if, DATA line 58 is UP, then keyboard 40 transmits via line 58 a nine-bit frame beginning with a start bit followed by eight series DATA bits representing the scan code identifying a particular key position of the keyboard.

Figure 3:
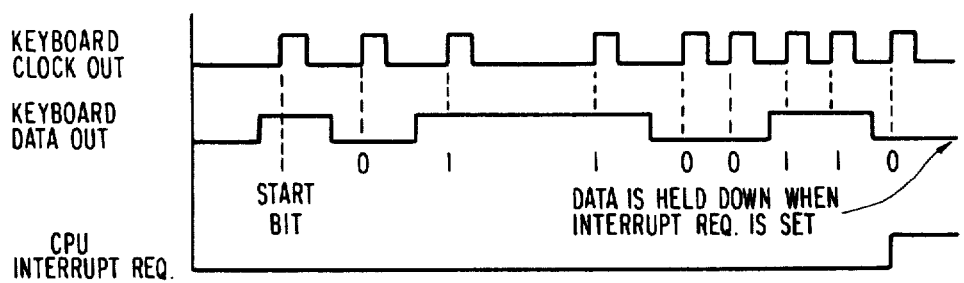
FIG. 3 is a timing diagram of the operation of the interface illustrated in FIG. 2.

As shown in FIG. 3, the start and eight-data bits are clocked or shifted into the nine-stage encoder 62 under the control of the keyboard OUT CLOCK. Note that the OUT CLOCK is not necessarily periodic, but that the data bits track the OUT CLOCK; thus, interface 28 is not tied to any specific clock frequency within the system, but rather is paced by the keyboard 40. During the transmission of the scan code frame via DATA line 58, interface 28 is under the control of the keyboard 40, and latch 68 is in its cleared or reset state with its $\bar{Q}$ output UP whereby DATA line 58 also UP.

However, when all nine bits of the scan code frame have been shifted or clocked into the encoder 62, the start bit in the most significant stage is clocked by the OUT CLOCK to the D input of latch 48, thereby setting the latch, raising the Q output to send the INTERRUPT REQUEST to the system bus, and lowering the $\bar{Q}$ output, thus applying ground potential to DATA line 58 and causing the DATA line to go DOWN; since the keyboard will sense by its SENSE DATA line 57 the DOWN condition of DATA line 58, the keyboard is prevented from transmitting any additional data. However, after the INTERRUPT REQUEST has been granted and the eight data bits transmitted in parallel from the encoder via DI/DO 22 to the system bus 10, a CLEAR signal from the CPU is applied to the CLR terminal of latch 68, thereby clearing or resetting the latch to cause the $\bar{Q}$ output to go UP and permitting DATA line 58 to return to the UP state which is sensed by the keyboard SENSE DATA line 56 to permit the next scan code frame to be transmitted to the interface 28.

While there has been described what is at present considered to be the preferred embodiment of this invention, it will be obvious to those skilled in the art that various changes and modifications may be made therein without departing from the invention, and it is, therefore, intended to cover all such changes and modifications as fall within the true spirit and scope of the invention.

We claim:

1. In a data processing system including a system bus for transferring address, data and control signals among a central processing unit, a memory and a self-scanning serial keyboard, all connected to the bus, said keyboard having a clock line for transmitting a keyboard out clock signal and a data line for transmitting a serial scan out code in a frame headed by a start bit followed by a predetermined number of serial data bits identifying a key position, an improved interface for providing two-way communication between the bus and the keyboard, and comprising:

serial-to-parallel shift register encoder means for storing in parallel the frame of serial bits under the control of the clock signal and having (1) a clock terminal connected to said keyboard clock line, (2)

a serial data input terminal connected to said keyboard data line, (3) said predetermined number of parallel output data lines connected to the bus, and (4) a control line coupled to the most significant stage of said encoder, said encoder having the same number of stages as the number of bits in a frame, whereby, when said encoder contains said start bit signal and said predetermined number of data bits, a control signal is produced on said control line; and control means, responsive to said control signal and to said keyboard out clock signal, for applying a central processing unit interrupt signal to the bus and for applying to said data line a disabling signal which prevents further transmission of data bits by the keyboard, said control means also being responsive to a clear signal from the central processing unit to remove the disabling signal from the data line when said data bits have been transferred from said encoder means to said bus, thereby permitting transmission of another scan code frame from the keyboard to said encoder means.

2. An improved interface as defined in claim 1 wherein said control means comprises a D-type edge-triggered latch having its D input terminal connected to said control line, its clock terminal connected to said clock line, its Q set output terminal connected to the bus, its $\overline{Q}$ reset output terminal connected to the data line, and its clear terminal connected to the bus, whereby said control signal sets said latch to generate said interrupt signal on said Q output terminal and said disabling signal on said $\overline{Q}$ reset output terminal when an entire scan code frame is stored in said encoder, said clear signal being applied to said clear terminal to reset said latch and cause said $\overline{Q}$ reset output terminal to remove said disabling signal from said data line.

3. An improved interface as defined in claim 2 further comprising means, connected to the bus; for applying to said clock line a disabling signal to disable the out clock signal and to reset the keyboard.

4. An improved interface as defined in claim 2 further comprising gate means, coupled between said data line and said $\overline{Q}$ reset output terminal, responsive to said disabling signal for applying ground potential to said data line.

5. An improved interface as defined in claim 1 further comprising means, connected to the bus, for applying to said clock line a disabling signal to disable the out clock signal.

6. An improved interface as defined in claim 1 further comprising means, connected to the bus, for applying to said clock line a disabling signal to disable the out clock signal and to reset the keyboard.

7. An improved interface as defined in claim 1 wherein said control means comprises a D-type edge-triggered latch having its D input terminal coupled to said control line, its clock terminal coupled to said clock line, its Q set output terminal providing said interrupt signal, its $\overline{Q}$ reset output terminal coupled to disable the data line, and its clear terminal coupled to the bus, whereby said control signal sets said latch to generate said interrupt signal on said Q output terminal and said disabling signal on said $\overline{Q}$ reset output terminal when an entire scan code frame is stored in said encoder, said clear signal being applied to said clear terminal to reset said latch and cause said $\overline{Q}$ reset output terminal to remove said disabling signal from said data line.

8. An improved interface as defined in claim 7 further comprising means, coupled to the bus, for applying to said clock line a disabling signal to disable the out clock signal.

9. An improved interface as defined in claim 7 further comprising gate means, coupled between said data line and said $\overline{Q}$ reset output terminal, responsive to said disabling signal for applying ground potential to said data line.

10. In a data processing system including a system bus for transferring address, data and control signals among an interruptable central processing unit, a memory and a self-scanning serial keyboard, all connected to the bus, said keyboard having a clock line for transmitting a keyboard out clock signal and a data line for transmitting a serial scan out code in a frame headed by a start bit followed by a predetermined number of serial data bits identifying a key position, an improved interface for providing two-way communication between the bus and the keyboard, and comprising:

serial-to-parallel shift register encoder means for storing in parallel the frame of serial bits under the control of the clock signal and having (1) a clock terminal coupled to said keyboard clock line, (2) a serial data input terminal connected to said keyboard data line, (3) said predetermined number of parallel output data lines connected to the bus, and (4) a control line coupled to the most significant stage of said encoder, said encoder having at least the same number of stages as the number of bits in a frame, whereby, when said encoder contains said start bit signal and said predetermined number of data bits, a control signal is produced on said control line; and control means, responsive to said control signal and to said keyboard out clock signal, for providing an interrupt signal to said central processing unit and for applying to said data line a disabling signal which prevents further transmission of data bits by said keyboard, said control means also being responsive to a clear signal from the central processing unit to remove the disabling signal from the data line when said data bits have been transferred from said encoder means to said bus, thereby permitting transmission of another scan code frame from the keyboard to said encoder means.

11. An improved interface as defined in claim 10 further comprising means, coupled to the bus, for applying to said clock line a disabling signal to disable the out clock signal.

12. In a data processing system including a system bus for transferring address, data and control signals among an interruptable central processing unit, a memory and a self-scanning serial keyboard, all connected to the bus, said keyboard having a clock line for transmitting a keyboard out clock signal and a data line for transmitting a serial scan out code in a frame headed by a start bit followed by a predetermined number of serial data bits identifying a key position, an improved method for providing two-way communication between the bus and the keyboard, comprising the steps of:

serially shifting into a serial-to-parallel shift register encoder a frame of serial bits, received on said data line under the control of the keyboard clock signal;

when a start bit having a predetermined fixed state is received in a most-significant bit position of said shift register encoder, providing an interrupt signal to said central processing unit and simultaneously applying to said data line a disabling signal for preventing further transmission of data bits by said keyboard; and removing said interrupt signal in response to a clear signal from said central processing means when said data bits have been transferred from said encoder means to said bus, thereby permitting transmission of another scan code frame from said keyboard to said shift register encoder.

13. An improved communication method as claimed in claim 12 further comprising the step of disabling said clock signal in response to a reset signal from said central processing means.

14. An improved communication method as claimed in claim 12 wherein said step of applying said disabling signal to said data line comprises applying a ground potential to said data line.

* * * * *